United States Patent [19]
York

[11] Patent Number: 5,984,533
[45] Date of Patent: Nov. 16, 1999

[54] OPTICAL FIBER CONNECTOR

[75] Inventor: James York, Scottsdale, Ariz.

[73] Assignee: Meteor Optics, Inc., Phoenix, Ariz.

[21] Appl. No.: 09/031,231

[22] Filed: Feb. 26, 1998

[51] Int. Cl.⁶ ....................................................... G02B 6/38
[52] U.S. Cl. ............................................................... 385/70
[58] Field of Search ............................ 385/70–80, 88–90

[56] References Cited

U.S. PATENT DOCUMENTS

| | | | |
|---|---|---|---|
| 4,179,186 | 12/1979 | Tynes | 385/98 |
| 4,711,520 | 12/1987 | Bernardini . | |
| 4,738,507 | 4/1988 | Palmquist | 385/78 |
| 4,738,508 | 4/1988 | Palmquist | 385/78 |
| 5,519,799 | 5/1996 | Murakami . | |
| 5,608,830 | 3/1997 | Belenkiy . | |

*Primary Examiner*—Akm E. Ullah
*Attorney, Agent, or Firm*—LaValle D. Ptak

[57] ABSTRACT

A connector system for multiple fiber optical cables aligns multiple optical fibers of one coaxial cable with corresponding multiple optical fibers of another coaxial cable or tool head. This is accomplished by forming off-axis fiber holes in the flat connector face of an end terminator for one of the multiple fiber cables. Similar off-axis fiber holes, in the same pattern as in the first cable end terminator, are formed in a second cable end terminator. Alignment flats are located adjacent the faces of each of the end terminators; and a coupling sleeve, having a slot in each of its ends for fitting over the alignment flats, is used to align the fiber holes in each of the end terminators with one another when the coupling sleeve is secured in place on the end terminators.

7 Claims, 2 Drawing Sheets

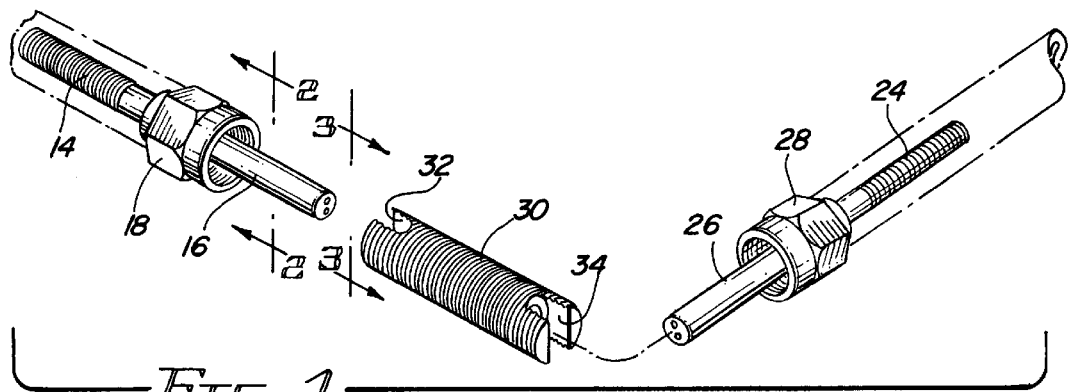
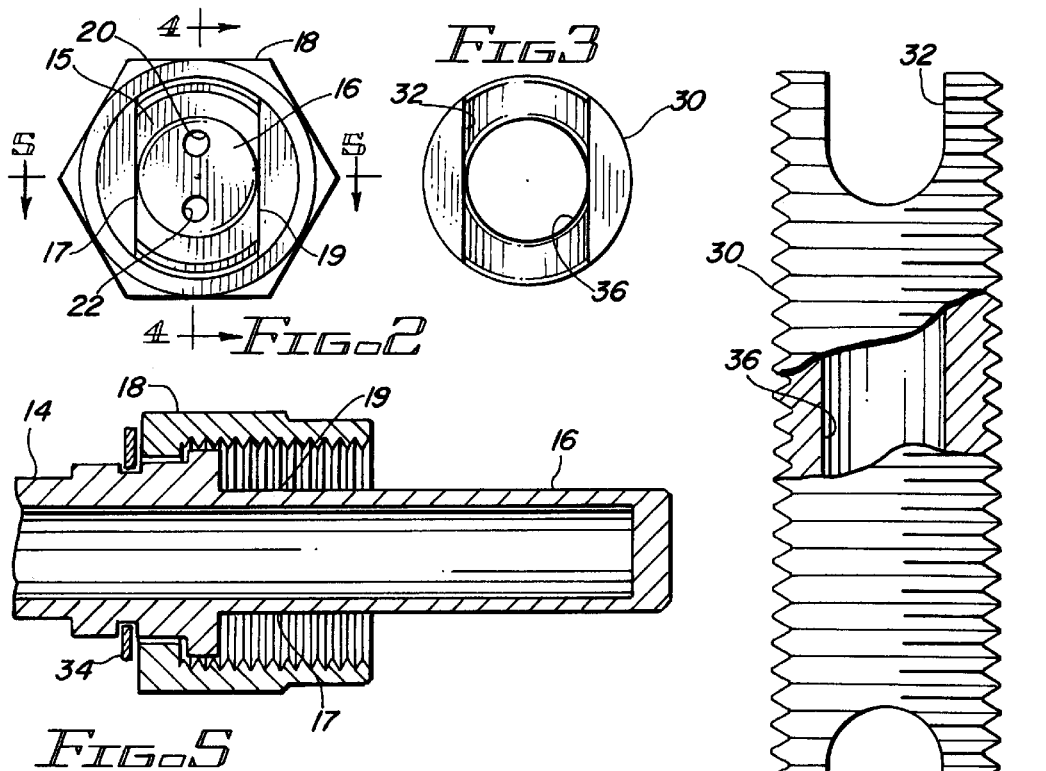
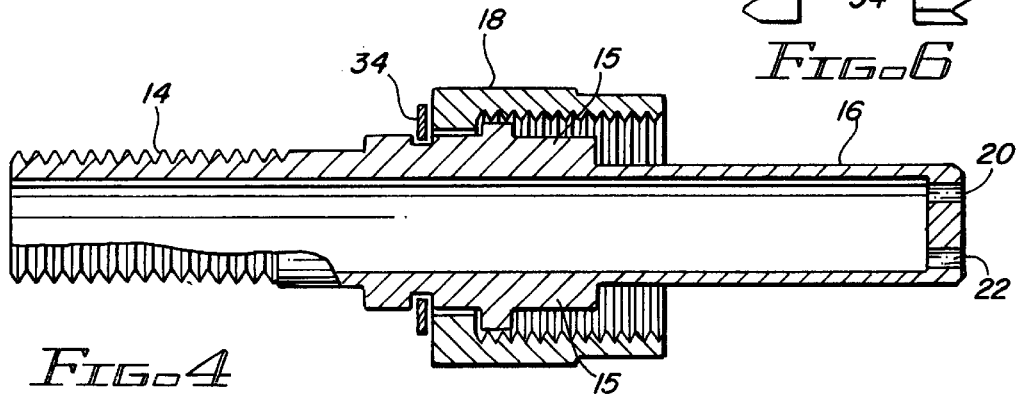

OPTICAL FIBER CONNECTOR

BACKGROUND OF THE INVENTION

Optical fibers are used in a variety of applications ranging from simple light displays to medical instruments and high speed data transmission. Frequently, it is necessary to interconnect one section of optical fiber to another section in a manner which might be likened to the interconnection or splicing of one electrical wire to another. The interconnections, however, of one optical fiber to another are more complex, since precise alignment of the ends of one optical fiber with the end of another optical fiber in the connector must be made in order to retain a high efficiency of light transmission through the connection.

When releasable connection of one end or the terminal end of an optical fiber to an optical fiber tool, which may be in the form of a releasable head or the like, is required, the alignment problem is compounded by the requirement for continued precision connections being maintained, even after many connections and disconnections have been made.

Connectors for connecting a single optical fiber in a cable or other terminator device with a releasable head are available; and alignment problems are relatively minor. A greater degree of complexity, however, exists when two or more fiber optic cables, such as in a duplexed fiber optic cable, must be interconnected to align the optical fibers in each of the cable terminators or in a cable terminator and a releasable working head of some type, since any misalignment of the optical fibers in the two portions being interconnected causes a significant reduction in the efficiency of light transmission through the connector. Essentially, such connections need to be made with nearly zero tolerance; so that misalignment does not take place.

It has been the practice in the past, when two duplex cables are to be interconnected, to split the end of the cable carrying the two optical fibers into two terminal devices. This means that two different connections have to be made between the two different cables, one connector for each of the optical fibers. This results in a bulky assembly and increases the cost of the connectors, because a separate connector must be used for each of the optical fibers in the cable.

Another approach which has been taken in the past is to use alignment pins (male and female) on the mating cables. The tolerances required make this difficult for ease in connecting and disconnecting the cables and terminal devices from one another when this must be done frequently. In a relatively short time, wear causes enough misalignment to occur that the resultant connection is unsuitable. In such situations, the cable connector must be discarded; and new connectors and/or new cables and operating heads or tools must be substituted for the ones where the misalignment wear has taken place.

The United States patent to Murakami U.S. Pat. No. 5,519,799 discloses a connector for fiber optic cables which fits over an hourglass-shaped guide portion used to terminate a flat tape optical fiber cable. The connector aperture has an internal configuration of an hourglass shape, which then aligns the terminating portions of each of the flat cables to be interconnected. This provides a proper alignment between the cables for the optical fiber array carried within the cables. The structure of the Murakami patent, however, is not adapted for interconnecting and aligning two mating cables having a circular cross section, or for aligning mating coaxial cables.

Two other United States patents to Belenkiy U.S. Pat. No. 5,608,830 and Bernardini U.S Pat. No. 4,711,510 illustrate other prior art optical fiber connectors. The Belenkiy patent is directed to a dual connector assembly, which takes two individual cables and spaces them apart and aligns them for connection. This technique is similar to the one described above where the cables are separated and provided with independent terminators and connectors for interconnection. The Bernardini patent is directed to a connector back shell and does not disclose the manner of interconnecting and aligning a pair of optical fibers carried within a single cable.

It is an object of this invention to provide a simple and effective solution for aligning and connecting multiple optical fibers located within a single cable sheath using a single, simple connector for effecting both the connection and alignment of the terminal ends of the cables being connected.

SUMMARY OF THE INVENTION

Accordingly, it is an object of this invention to provide an improved optical fiber connector.

It is another object of this invention to provide an improved optical fiber connector for aligning and connecting multiple optical fibers located within a single cable sheath.

It is an addition object of the invention to provide an optical fiber connector capable of accurately aligning multiple optical fibers terminating in a flat face with a corresponding set of optical fibers terminating in a second flat face.

It is a further object of this invention to provide an improved connector employing alignment flats and a mating sleeve to repeatedly and accurately align corresponding multiple optical fibers terminating in mating faces on two optical fiber cable terminators.

In accordance with a preferred embodiment of this invention, a connector system for multiple fiber optical cables is provided. This system aligns the multiple optical fibers of one cable with corresponding multiple optical fibers of another cable or tool head. The first cable has a first end terminator with an extended cylindrical portion terminating in a flat face having a plurality of spaced openings in a predetermined pattern. The ends of a like plurality of optical fibers terminate in the spaced openings. This first end terminator also has at least two spaced-apart flats perpendicular to the flat face for aligning a mating sleeve. A second end terminator, essentially identical to the first end terminator, is used to terminate and locate a corresponding plurality of optical fibers in the same predetermined pattern in the second end terminator. The second cable end terminator has at least two spaced-apart flats on it perpendicular to the flat face for aligning a coupling sleeve. A hollow coupling sleeve with first and second slotted ends is dimensioned so that the slotted ends fit over the respective flats on the first and second end terminators to cause the plurality of spaced openings in the first end terminator to be aligned with the same plurality of spaced openings in the second end terminator when the coupling sleeve is secured in place over the first and second end terminators.

BRIEF DESCRIPTION OF THE DRAWINGS

FIG. 1 is an exploded view of a preferred embodiment of the invention;

FIG. 2 is an end view taken along the line 2—2 of FIG. 1;

FIG. 3 is an end view taken along the line 3—3 of FIG. 1;

FIG. 4 is a cross-sectional view taken along the line 4—4 of FIG. 2;

FIG. 5 is a cross-sectional view taken along the line 5—5 of FIG. 2;

FIG. 6 is an enlarged view of a portion of the embodiment shown in FIG. 1;

DETAILED DESCRIPTION

Figure 7:
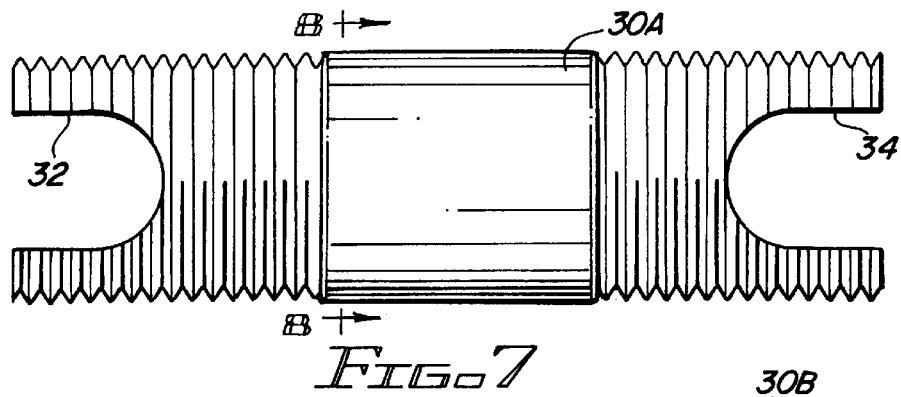
FIG. 7 is an alternate to the embodiment of the portion shown in FIG. 6.

Reference now should be made to the drawings in which the same or similar reference numbers are used throughout the different figures to designate the same components. FIG. 1 is an exploded view of a preferred embodiment of the invention. This figure shows two end terminator connectors 14, 16, 18, and 24, 26, 28 for terminating the corresponding pair of coaxial optical fiber cables. The cables have not been shown in FIG. 1; but the terminator 14, 16, 18 consists of an externally threaded portion 14, which is secured into the end of the optical fiber coaxial cable (not shown) in a conventional manner. The fibers themselves extend through the hollow interior of the terminator (shown most clearly in FIGS. 4 and 5) to terminate in a pair of off-axis holes 20 and 22 in the end face of a cylindrical extension 16 of the connector, as shown most clearly in FIGS. 1 and 4. When the optical fibers (not shown) are secured in the holes 20 and 22, the ends are ground flat with the end face of the portion 16; so that light transmitted through the optical fibers is transmitted perpendicular to the end face of the connector.

A second similar terminator connector comprising an externally threaded portion 24 and a cylindrical extension 26 has a corresponding pair of holes similar to the ones 20 and 22 described in conjunction with the device shown in FIGS. 1 and 4. In all other respects, the device 24/26/28 is identical to the device 14/16/18.

In order to both align and connect the portions 16 and 26 with one another along a precisely aligned central axis passing through the axis of both of the cylindrical portions 16 and 26, a connector coupling sleeve 30 is employed. The sleeve is engaged on opposite ends by a pair of rotating captive nuts 18 and 28 to secure the two end terminator connectors together. The sleeve 30 is externally threaded throughout its length and is secured by the internally threaded nuts 18 and 28 on the respective end terminator devices. The nuts 18 and 28 are rotated to tighten the sleeve 30 into engagement with a shoulder 15 on the terminator 14/16, and with an identical shoulder (not shown) on the terminator 24/26. Without anything more, however, no alignment of the holes 20 and 22 on the extension 16 with corresponding holes on the extension 26 could be ensured.

In order to ensure accurate alignment of the off-axis holes 20 and 22 in both of the cable end terminators, a pair of parallel flats 17 and 19 are formed, as shown in FIGS. 2 and 5 on the terminator 14/16/18. These flats extend beyond the circular shoulder 15 toward the portion 14, as is readily apparent from an examination of FIGS. 4 and 5.

Corresponding complementary slots 32 and 34 then are formed or cut in the opposite ends of the coupling sleeve 30, with the distance between the surfaces of the sides of the slots 32 and 34 formed with precision to snugly fit over the flats 17 and 19 in the terminal connector 14/16 and, similarly, over identical flats in the terminal connector 24/26. The surfaces 17 and 19 are parallel to one another, and also are parallel to a line extending through the centers of each of the openings 20 and 22 and through the axis of the extensions 16 and 26, respectively. This causes a precise 11 alignment of all of the parts. Similarly, the slots 32 and 34 are formed so that the corresponding surfaces on each side of the two slots 32 and 34 are in parallel planes corresponding to the planes of the flats 17 and 19. Thus, when the sleeve 30 is engaged by the captive nuts 18 and 26 to tighten the sleeve into position where the slot 32 extends over the flats 17 and 19 in the extension 16 and the slot 34 extends over corresponding flats in the extension 26. Precise alignment of holes 20 and 22 in both of the terminator extensions 16 and 26 is ensured. It should be noted that the free rotating nuts 18 and 26 are held captive by a split washer 34 in a conventional manner.

When the connector sleeve 30 is engaged by the nuts 18 and 28, the ends initially are out of engagement with the shoulder 15 or the flats 17 and 19. As the sleeve 30 is pulled into tighter engagement toward the shoulder 15, if it initially is misaligned so that the slot 32 does not engage the flats 17 and 19, a slight wiggling of the terminal connector 14/16 relative to the sleeve 32 will result in engagement of the slot 32 with the flats 17 and 19. Further tightening of the nut 18 until the sleeve 30 is tightly engaged with the shoulders on the connector, located within the nut 18, occurs to firmly hold the sleeve 30 in place. A similar connection is made at the opposite end in conjunction with the slot 34 and the nut 28 on the cable end terminator 24/26.

It is readily apparent that this device provides an accurate, quick and simple interconnection for both interconnecting and aligning a pair of optical fibers terminating in cables respectively terminated by the devices 14, 16 and 24, 26. The system which is shown in FIGS. 1 through 6 is particularly useful in medical applications where the terminator 24/26, for example, is connected to a medical device of some type and must frequently be removed and replaced. The system accurately maintains alignment of the holes 20 and 22 in both of the sleeves 16 and 26 throughout repeated connections and disconnections of the various parts shown in the drawings.

Figures 8, 10:
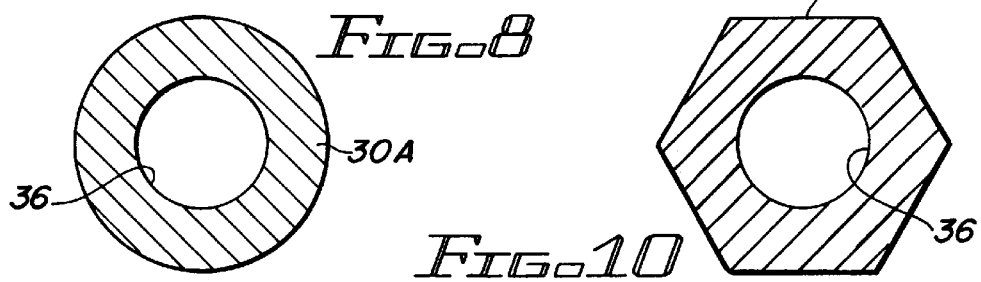
FIG. 8 is a cross-sectional view taken along the line 8—8 of FIG. 7.
FIG. 10 is a cross-sectional view taken along the line 10—10 of FIG. 9.

FIGS. 7 and 8 are directed to a variation or another embodiment of the coupling sleeve 30. The sleeve 30A shown in FIGS. 7 and 8 operates in the same manner as the sleeve 30 shown in FIG. 6. In the device of FIG. 7, however, the sleeve 30A has an unthreaded, circular cross-section, center portion, as illustrated.

Figure 9:
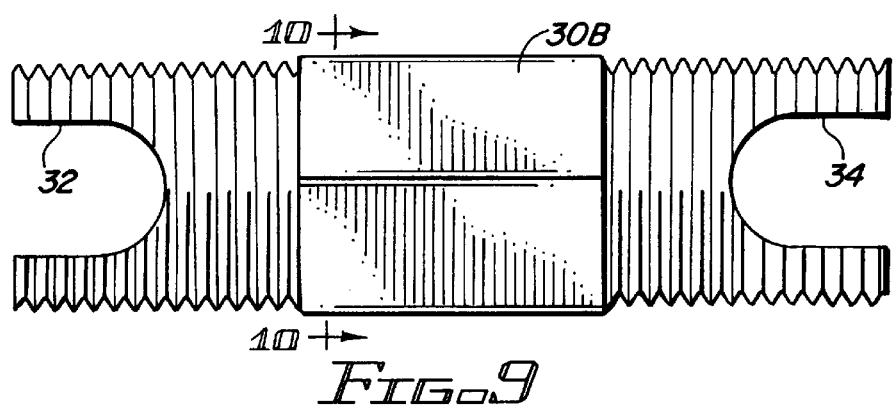
FIG. 9 is another alternate to the embodiment of the portion shown in FIG. 6.

FIGS. 9 and 10 show yet another variation of the sleeve 30, which has been described above in conjunction with the embodiment of FIGS. 1 through 6. In the device of FIGS. 9 and 10, the center portion of the coupling sleeve 30B has a hexagonal external configuration located between the two threaded ends having slots 32 and 34. The sleeve 30B of FIGS. 9 and 10 operates in the same manner as the sleeve 30 shown in FIG. 6.

Figure 11:
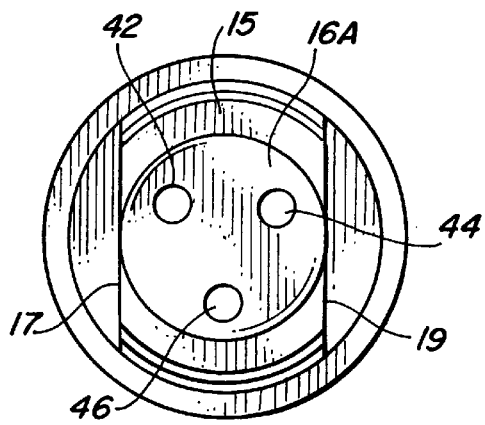
FIG. 11 is a variation of a portion of the device shown in FIG. 2.

FIG. 11 illustrates another variation of an end terminator for the cable which is identical in all respects to the one shown in FIG. 2, with the exception that three holes 42, 44 and 46, which are accurately aligned at 120° from the center axis of the extension 16A (or 26A) are shown. This device then could be used to terminate three optical fibers instead of the two illustrated in conjunction with the openings 20 and 22 of the embodiment of FIG. 2. Again, in all other respects the embodiment shown in FIG. 11 operates with all of the other parts shown in FIGS. 1 through 6, in the same manner as the variation shown in FIG. 2.

Figure 12:
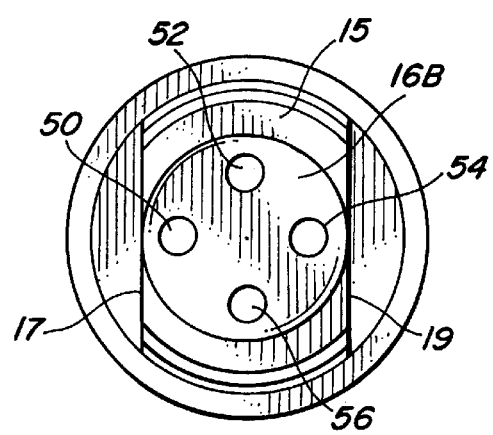
FIG. 12 is another variation of a portion of the device shown in FIG. 2.

FIG. 12 is another variation illustrating the manner in which four optical fibers may be terminated and accurately aligned with corresponding optical fibers in another identical terminator device. In the device shown in FIG. 12, four holes 50, 52, 54 and 56 are formed in the face 16B. These holes also would be formed in the face of a corresponding device 26B and are accurately aligned by virtue of the slots 17 and 19 and the connector sleeve 30, 30A or 30B in the same manner described previously.

The foregoing description of the preferred embodiment of the invention is to be considered as illustrative and not as limiting. Various modifications and changes will occur to those skilled in the art for performing substantially the same function, in substantially the same way, to achieve substantially the same result without departing from the true scope of the invention as defined in the appended claims.

What is claimed is:

1. A connector system for multiple fiber optical cables which aligns multiple optical fibers of one cable with corresponding multiple optical fibers of another cable or tool head, said connector system including in combination:

a first cable end terminator having an extended cylindrical portion terminating in a flat face with a plurality of spaced openings in a predetermined pattern for terminating the ends of a like plurality of optical fibers, said first cable end terminator having at least two spaced-apart flats perpendicular to the flat face for aligning a coupling sleeve;

a second cable end terminator having an extended cylindrical portion terminating in a flat face with a plurality of spaced openings in said predetermined pattern of said first cable end terminator for terminating the ends of a like plurality of optical fibers, said second cable end terminator having at least two spaced-apart flats perpendicular to the flat face of said second cable end terminator for aligning a coupling sleeve;

a hollow cylindrical coupling sleeve with first and second ends, said sleeve having an internal cross section complementary to the extended cylindrical portions of said first and second cable end terminators and fitting over said extended cylindrical portions, said first and second ends of said coupling sleeve being slotted in a complementary pattern to fit over said spaced-apart flats on said first and second cable end terminators, respectively, to cause said predetermined pattern of spaced openings on the flat faces of said first and second cable end terminators to be aligned with one another; and a device for releasably holding said coupling sleeve in place with the slotted ends thereof extending over said spaced-apart flats on said first and second cable end terminators.

2. The combination according to claim 1 wherein said spaced-apart flats in said first and second cable end terminators are parallel to one another.

3. The combination according to claim 2 wherein said spaced-apart flats in said first cable end terminator are located in the same physical orientation with respect to said spaced openings therein as the corresponding spaced-apart flats in said second cable end terminator.

4. The combination according to claim 3 wherein said coupling sleeve is a cylindrical sleeve with at least a portion adjacent the first and second ends thereof being externally threaded and said device for releasably holding said coupling sleeve in place on said first and second cable end terminators comprises an internally threaded nut rotatably held captive on each of said cable end terminators for engagement with the threads of said hollow mating sleeve.

5. The combination according to claim 1 wherein said coupling sleeve is a cylindrical sleeve with at least a portion adjacent the first and second ends thereof being externally threaded and said device for releasably holding said coupling sleeve in place on said first and second cable end terminators comprises an internally threaded nut rotatably held captive on each of said cable end terminators for engagement with the threads of said hollow mating sleeve.

6. The combination according to claim 1 wherein said spaced-apart flats in said first cable end terminator are located in the same physical orientation with respect to said spaced openings therein as the corresponding spaced-apart flats in said second cable end terminator.

7. The combination according to claim 6 wherein said coupling sleeve is a cylindrical sleeve with at least a portion adjacent the first and second ends thereof being externally threaded and said device for releasably holding said coupling sleeve in place on said first and second cable end terminators comprises an internally threaded nut rotatably held captive on each of said cable end terminators for engagement with the threads of said hollow mating sleeve.

* * * * *